(12) United States Patent
Amundsen et al.

(10) Patent No.: US 6,209,789 B1
(45) Date of Patent: Apr. 3, 2001

(54) OPTICAL FILTERING SYSTEM FOR A LASER BAR CODE SCANNER HAVING NARROW BAND-PASS CHARACTERISTICS EMPLOYING SPATIALLY SEPARATED FILTERING ELEMENTS INCLUDING A SCANNER WINDOW

(75) Inventors: Thomas Amundsen, Turnersville; Robert Blake, Woodbury Heights; George Rockstein, Audobon; David M. Wilz, Sr., Sewell; Carl H. Knowles, Moorestown, all of NJ (US)

(73) Assignee: Metrologic Instruments, Inc., Blackwood, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,742

(22) Filed: Nov. 9, 1999

Related U.S. Application Data

(63) Continuation of application No. 09/258,005, filed on Feb. 26, 1999, which is a continuation of application No. 08/850, 295, filed on May 5, 1997, now abandoned, which is a continuation of application No. 08/439,224, filed on May 11, 1995, now Pat. No. 5,627,359, which is a continuation-in-part of application No. 08/293,491, filed on Aug. 19, 1994, now abandoned, which is a continuation of application No. 07/761,123, filed on Sep. 17, 1991, now Pat. No. 5,340,971.

(51) Int. Cl.[7] ..................................................... G06K 7/10
(52) U.S. Cl. .................................. 235/472.01; 235/462.35
(58) Field of Search ........................... 235/462.01, 462.2, 235/462.22, 462.25, 462.29, 462.28, 462.32, 462.36, 462.43, 472.01, 462.45, 462.35

(56) References Cited

U.S. PATENT DOCUMENTS

| | | | |
|---|---|---|---|
| 3,563,635 | * | 2/1971 | Lang ........................................ 348/339 |
| 4,093,865 | | 6/1978 | Nickl . |
| 4,387,297 | | 6/1983 | Swartz et al. . |
| 4,460,120 | * | 7/1984 | Shepard et al. ......................... 235/472 |
| 4,496,831 | | 1/1985 | Swartz et al. . |
| 4,647,143 | | 3/1987 | Yamazaki et al. . |
| 4,713,532 | | 12/1987 | Knowles . |
| 4,816,660 | | 3/1989 | Swartz et al. . |
| 4,861,973 | | 8/1989 | Hellekson et al. . |
| 5,015,833 | | 5/1991 | Shapard et al. . |
| 5,115,333 | | 5/1992 | Mergenthaler et al. . |
| 5,153,417 | | 10/1992 | Sakai et al. . |
| 5,180,904 | | 1/1993 | Shepard et al. . |
| 5,216,232 | | 6/1993 | Knowles et al. . |
| 5,349,172 | | 9/1994 | Roustaei . |
| 5,627,359 | * | 5/1997 | Amundsen et al. .................... 235/462 |

FOREIGN PATENT DOCUMENTS

| | | | |
|---|---|---|---|
| 0013831 | * | 1/1982 | (JP) ........................................ 359/890 |
| 62-147577 | | 7/1987 | (JP) . |
| 57-13831 | | 1/1992 | (JP) . |

* cited by examiner

Primary Examiner—Thien M. Le
(74) Attorney, Agent, or Firm—Nancy A. Smith, Esq.

(57) ABSTRACT

A novel optical filtering system for a laser bar code scanner having narrow band-pass characteristics is disclosed. The optical filtering system has two different optical filtering elements which are disposed in a scanner housing in a spatially separate relationship. One of the optical filtering elements is positioned inside of the scanner housing in front of and close to the light detection element. The other optical filtering element is positioned in the light transmission aperture of the scanner housing and forms the scanning window. The optical filtering characteristics of the scanning window obscure the internal components of the scanner from plain view making the scanner appear more aesthetically pleasing. Together the optical filtering element cooperate to form a narrow-band pass filter to provide for better light collection and scanning.

13 Claims, 5 Drawing Sheets

OPTICAL FILTERING SYSTEM FOR A LASER BAR CODE SCANNER HAVING NARROW BAND-PASS CHARACTERISTICS EMPLOYING SPATIALLY SEPARATED FILTERING ELEMENTS INCLUDING A SCANNER WINDOW

RELATED CASES

Continuation of application Ser. No. 09/258,005, filed Feb. 26, 1999, which is a Continuation of application Ser. No. 08/850,295, filed May 5, 1997 now abandoned, which is, a Continuation of application Ser. No. 08/439,224, filed May 11, 1995, now U.S. Pat. No. 5,627,359, which is a Continuation-in-Part of application Ser. No. 08/293,491 filed Aug. 19, 1994, now abandoned which is a Continuation of application Ser. No. 07/761,123 filed Sep. 17, 1991, now U.S. Letters Pat. No. 5,340,971, incorporated herein by reference in its entirety.

BACKGROUND OF THE INVENTION

1. Field of the Invention

The present invention relates generally to laser scanners used in reading bar and like code symbols, and more particularly to a novel optical filtering system for use therein, which provides improved scanner performance, appearance and manufacturability at lower cost.

2. Brief Description of the Prior Art

Laser-based bar code symbol scanning systems have become increasingly popular in recent times. However, despite technical advancements in the art, such systems still suffer from numerous problems that have yet to be adequately solved.

For example, a major problem with prior art laser scanners is that as they become more widely used in point-of-sale (POS) environments, aesthetic considerations play a greater role in their purchase decisions by store managers considering their use at POS locations. The reason for this is clear. Store owners invest in a great deal of time, money and artistic effort in making their stores and display counters attractive to customers. Consequently, store owners and managers demand that laser scanning systems do not detract from the appearance of their display and check-out counter environments.

Another problem with prior art laser scanning systems is that the laser, mirrors, and other electro-optical components used in such systems are revealed to customers at POS locations through optically transparent scanning windows. Consequently, the sight of rotating mirrors and swirling laser beams behind the scanning windows of prior art laser scanners, constitutes a significant source of fear to many customers. While such fears are often based on a lack of knowledge of lasers and optics, store managers are nevertheless concerned that such fears may translate into customer anxiety and thus a decrease in sales.

Other problems of a more technical nature arise when using prior art laser scanners in POS environments. In particular, typical ambient lighting levels in store environments have the potential of adversely effecting the signal-to-noise ratio (SNR) of laser scan data signals detected within prior art laser scanners. Thus, to date, a number of different optical filtering techniques have been developed for use in combating the adverse effects of ambient lighting levels on laser scanner performance. Several optical filtering techniques commonly employed are detailed below.

One popular filtering technique involves installing before the scanner photodetector, a band-pass optical filter narrowly tuned to the laser wavelength. Typically, this wavelength lies in the visible region of the electromagnetic spectrum (i.e., about 670 nanometers). This common filtering technique is used in the prior art laser scanning systems disclosed in U.S. Pat. Nos. 5,180,904; 5,015,833; 4,816,660; 4,387,297 and 5,115,333. However, this approach is not without shortcomings and drawbacks. When using this approach, store customers are typically permitted to see the rotating or oscillating mirrors and swirling laser beams behind the scanning window. In addition to presenting a source of worry for many customers, the plain view of such electro-optical components also detracts from the overall aesthetic appearance of laser scanners employing this common filtering technique.

Another prior art approach to reducing ambient light in a post-based laser scanners involves installing a spatial filter (i.e., a slotted or aperture plate) over the scanning window of the laser scanner. Typically, the aperture or slot pattern of the aperture plate spatially corresponds to the cross-sectional geometry of projected laser scanning pattern at the plane of its scanning window. This spatial filtering technique is used in the many prior art laser scanning systems, disclosed in U.S. Pat. Nos. 4,713,532; 4,093,865; and 4,647,143. However, this approach is not without its shortcomings and drawbacks. Such spatial filters detract from the overall appearance of the laser scanners in which they are employed. In addition, such spatial filters cannot be effectively used when the laser scanning patterns are spatially complex, as in the case of the omnidirectional projection laser scanner disclosed in U.S. Pat. No. 5,216,232.

Thus, there is a great need in the art for a laser scanner which solves the above-described problems, while overcoming the shortcomings and drawbacks of prior art laser scanning apparatus and methodologies.

OBJECTS OF THE INVENTION

Accordingly, it is a primary object of the present invention to provide a laser bar code symbol scanning system that is capable of reading bar code symbols, without the shortcomings and drawbacks of prior art devices.

A further object of the present invention is to provide a laser bar code symbol scanner having a novel optical filtering system which provides improved scanner performance, appearance and manufacturability.

A further object of the present invention is to provide such a laser bar code symbol scanner, in which the wavelength-selective components of the optical filter system are strategically installed in a spatially-separated manner in order to achieve improved scanner performance, appearance and manufacturability, in a simple low-cost manner.

A further object of the present invention is to provide such a laser bar code symbol scanner in which the optical filtering system employed therein inherently hides from view, unappealing electro-optical components mounted within the laser scanner housing, while rejecting unwanted spectral noise outside the narrow spectral band of the laser scanning beam.

A further object of the present invention is to provide a laser bar code symbol scanner that satisfies the concerns of store owners and managers alike, while effectively overcoming the problems caused by high intensity ambient lighting.

These and further objects of the present invention will become apparent hereinafter and in the claims.

SUMMARY OF THE PRESENT INVENTION

In general, the laser scanner of the present invention provides a simple, low cost solution to the problems described in the Background of the Invention. This is achieved by strategically embodying a pair of discrete optical filter elements in the housing of a laser scanner in which the following system components are provided; a light transmission window; a laser source for producing a laser beam having a predetermined characteristic wavelength; a scanning mechanism for projecting the produced laser beam through the light transmission window, and scanning the produced laser beam across a scanning field defined external to the housing; a laser light focusing means for focusing laser light reflected off a scanned bar code symbol, and along a focused laser light return path within the housing; and a laser light detection means, disposed along the focused laser light return path, for detecting the intensity of focused laser light and generating an electrical signal representative thereof.

In accordance with the present invention, the first optical filter element is installed over the light transmission aperture of the scanner housing, and has wavelength selective properties which transmit only light having wavelengths from slightly below a predetermined wavelength in the visible band of the electromagnetic spectrum (e.g., slightly below 670 nanometers and greater). The second optical filter element is installed within the housing, along the focused laser return light path and between the light focusing means and the first optical filter element, and transmits only light having wavelengths from slightly above the predetermined wavelength (e.g., slightly above 670 nanometers and greater). Collectively, the first and second optical filter elements cooperate to form a narrow wavelength band-pass filtering system centered about the predetermined wavelength, thereby rejecting wavelengths outside the spectral band of the scanned laser beam and thus providing improved signal-to-noise ratio.

As a result of this novel laser scanner construction, the wavelength selective properties of the first optical filter element inherently render it semi-transparent, and thus hide from plain view, otherwise aesthetically unappealing electro-optical components mounted within the scanner housing. At the same time, the second optical filter element can be made substantially smaller than the size of the light transmission window over which the first optical filter element is installed, yet still cooperate with the first optical filter element to achieve narrow wavelength band-pass filtering about the characteristic wavelength of the laser beam. Whereas the optical filtering properties of the relatively large first optical filter element render its manufacture relatively easy and inexpensive, the optical filtering properties of the relatively small second optical filter element render its manufacture relatively difficult and expensive. Thus, laser scanner construction of the present invention represents a significant advance in the state of the art in laser scanner design and construction.

In summary, the present invention provides a simple and inexpensive way of making a laser bar code symbol scanner that satisfies the concerns of store owners and managers alike, while effectively overcoming the problems caused by high intensity lighting conditions in POS environments.

BRIEF DESCRIPTION OF THE DRAWINGS

For a fuller understanding of the Objects of the Present Invention, the Detailed Description of the Illustrated Embodiments will be taken in connection with the accompanying Drawings, wherein.

DETAILED DESCRIPTION OF THE ILLUSTRATIVE EMBODIMENT

For purposes of illustration, the present invention will be described below with reference to the accompanying Drawings, with like structures being indicated by like reference numbers.

Figure 1:
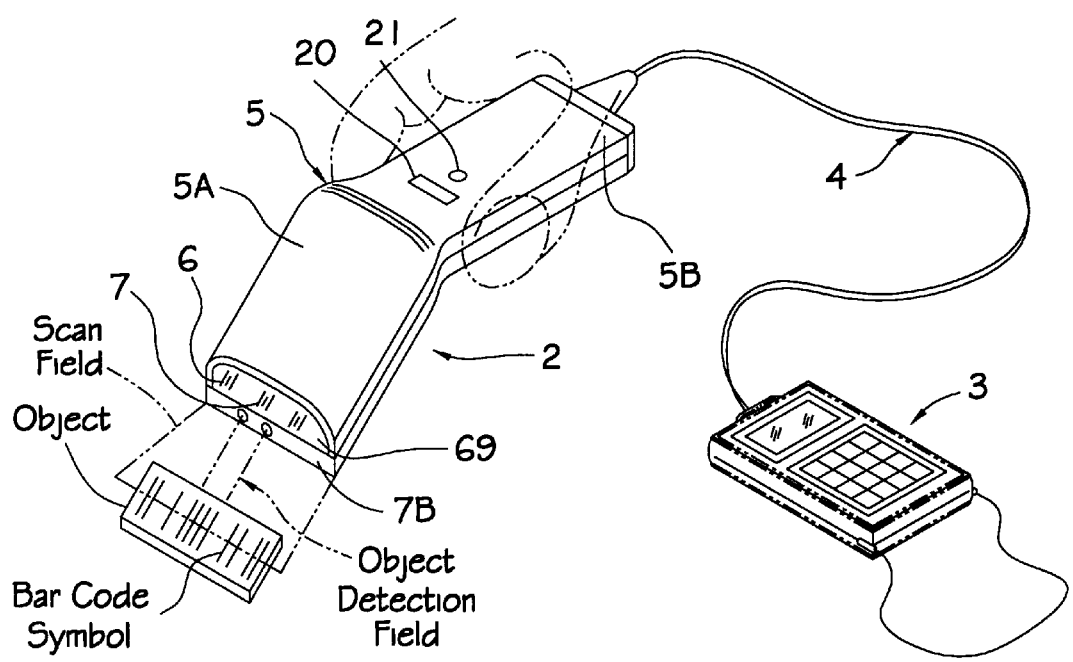
FIG. 1 is a perspective view of a laser bar code symbol reading device constructed in accordance with the principles of the present invention.

As shown in FIG. 1, automatic bar code symbol reading system 1 of the first illustrative embodiment comprises an automatic hand-holdable bar code symbol reading device 2 operably associated with hand-holdable data collection device 3, described in detail in U.S. Pat. No. 5,340,971. Operable interconnection of bar code symbol reading device 2 and data collection device 3 is achieved by a flexible multiwire connector cord 4 extending from bar code symbol device 2 and plugged directly into the data-input communications port of the data collection device 3.

Figure 2:
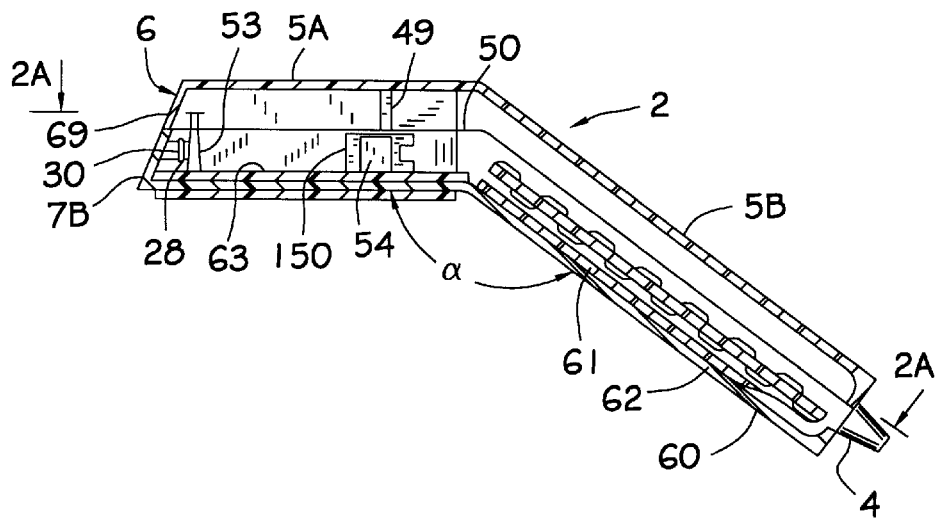
FIG. 2 is a cross-sectional elevated side view along the longitudinal extent of the bar code symbol reading device of FIG. 1, showing various hardware and software components used in realizing the illustrative embodiment.
Figure 2A:
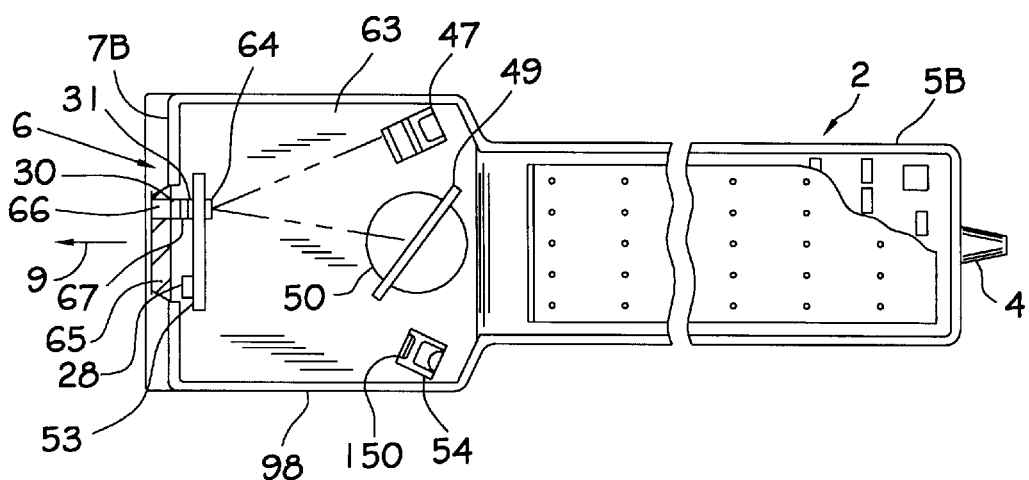
FIG. 2A is a cross-sectional plan view along with longitudinal extent of the bar code symbol reading device taken along line 2A—2A of FIG. 2, also showing the various components used in realizing the illustrative embodiment.

Referring to FIGS. 1 through 2A, automatic bar code symbol reading device 2 is shown to comprise an ultra-lightweight hand-holdable housing 5 having a head portion 5A that continuously extends into a contoured handle portion 5B. As illustrated in FIGS. 1 through 3A, the head portion of housing 5 has a transmission aperture 6 formed in an upper portion of front panel 7 and covered by plastic filter lens 69, to permit laser radiation of a predetermined band of wavelengths, to exit and enter the housing. In general, the lower portion of front panel 7B is optically opaque, as are all other surfaces of the housing.

As illustrated in FIG. 1, bar code reading device 2 generates two different fields external to the hand-holdable housing, in order to carry out automatic bar code symbol reading according to the principles of the present invention. Specifically, an object detection field, indicated by broken and dotted lines, is provided externally to the housing for detecting energy reflected off an object bearing a bar code, located within the object detection field. A scan field, on the other hand, having at least one scanning plant of essentially planar extent, is provided external to the housing for scanning an object present within the scan field. Such scanning is achieved with a laser light beam so that scan data can be collected for detecting the presence of a bar code within the scan field, and subsequently reading (i.e., scanning and decoding) the detected bar code symbol.

In general, the energy reflected off an object in the object detection field can be optical radiation or acoustical energy, either sensible or non-sensible by the operator, and may be either generated by an external ambient source, or from the automatic bar code symbol reading device itself. In the illustrative embodiment, this energy is a beam of infrared light projected forwardly from transmission aperture 6 in a spatially directed fashion, preferably essentially parallel to the longitudinal axis 9 of the head portion of the housing. In a preferred embodiment, the object detection field has a three-dimensional volumetric expanse spatially coincident with the transmitted infrared light beam. This ensures that an object within the object detection field will be illuminated by the infrared light beam and that infrared light reflected therefrom will be directed generally towards the transmission aperture of the housing where it can be detected, to indicate that an object is within the object detection field.

In order to scan a bar code symbol on an object within the object detection field, a laser light beam having a characteristic wavelength $\lambda c$ is automatically generated within the head portion of the housing and repeatedly scanned through the transmission aperture across the scan field. As illustrated in FIG. 1, at least a portion of the scanned laser beam aligned with bar code on the detected object, will be reflected off the bar code and directed back towards and through the transmission aperture for collection, detection and subsequent processing in a manner which will be described hereinafter.

To more fully appreciate the mechanisms employed in providing the object detection and scan fields of bar code symbol reading device 2, reference is best made to the operative elements within the hand-holdable housing.

Figure 4:
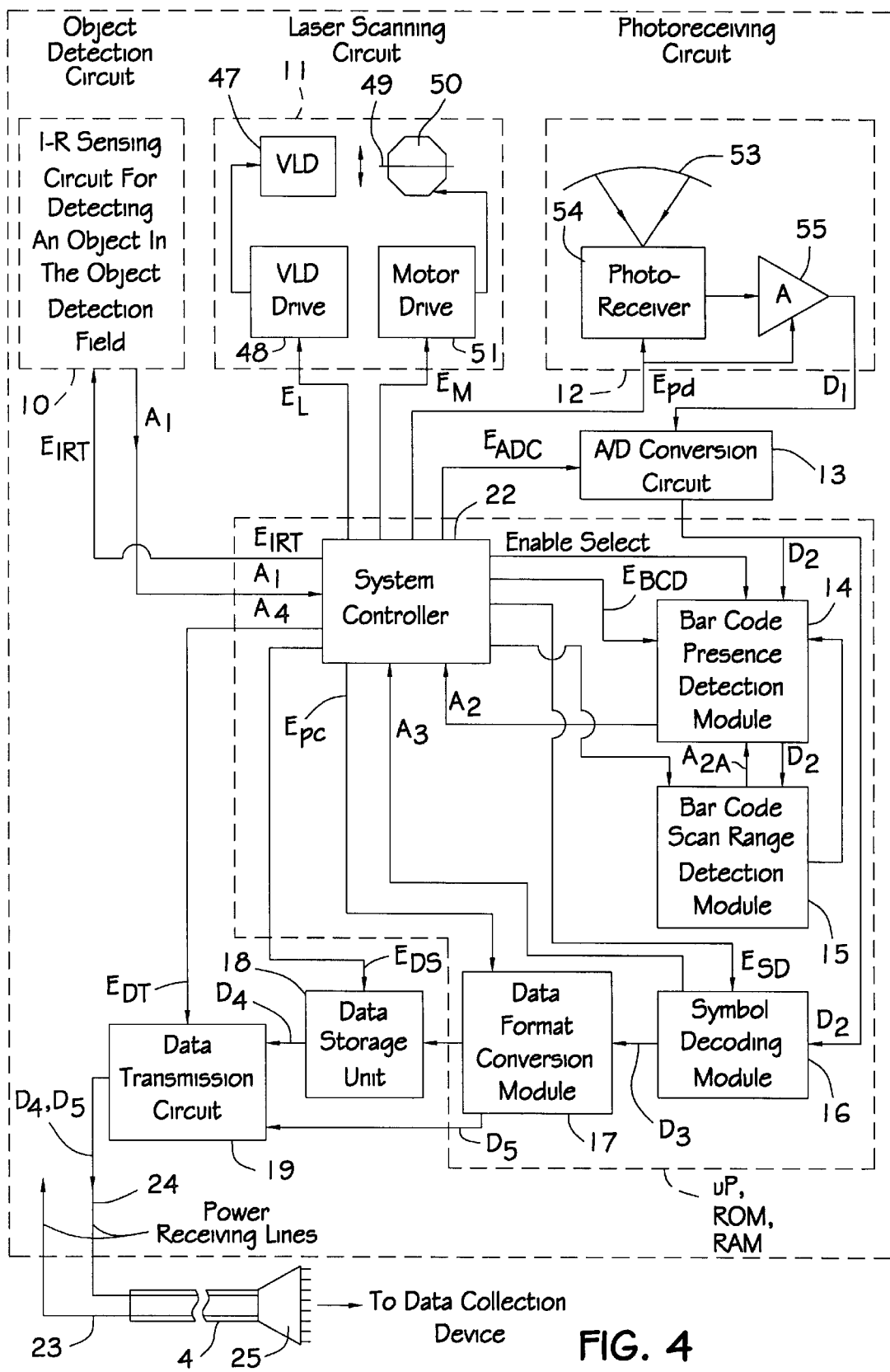
FIG. 4 is a block functional system diagram of the bar code symbol reading device of the illustrative embodiment of the present invention, illustrating the principal components of the device integrated with the control system thereof.

As shown in FIG. 4, bar code symbol reading device of the first illustrated embodiment comprises a number of system components, namely, an object detection circuit 10, scanning means 11, photoreceiving circuit 12, analog-to-digital (A/D) conversion circuit 13, bar code presence detection module 14, bar code scan range detection module 15, symbol decoding module 16, data format conversion module 17, symbol character data storage unit 18, and data transmission circuit 19. In addition, a magnetic field sensing circuit 20 is provided for detecting a housing support stand, while a manual switch 21 is provided for selecting long or short range modes of object and bar code presence detection. As illustrated, these components are operably associated with a programmable system controller 22 which provides a great degree of versatility in system control, capability and operation. The structure, function and advantages of this controller will be described in detail hereinafter.

In the illustrative embodiment, system controller 22, bar code presence detection module 14, bar code scan range detection module 15, symbol decoding module 16, and data format conversion module 17 are realized using a single programmable device, such as a microprocessor having accessible program and buffer memory, and external timing means. It is understood, however, that any of these elements can be realized using separate discreet components as will be apparent to those skilled in the art.

The purpose of the object detection circuit is to determine (i.e., detect) the presence of an object (e.g., product, document, etc.) within the object detection field of bar code symbol reading device 2, and in response thereto, automatically produce first control activation signal $A_1$. In turn, first control activation signal $A_1$ is provided as input to the system controller which, as will be described in greater detail hereinafter, causes the device to undergo a transition to the bar code symbol presence detection state.

As illustrated in FIG. 4, scanning means 11 comprises a light source 47 which, in general, may be any source of intense light suitably selected for maximizing the reflectivity from the object's surface bearing the bar code symbol. In the illustrative embodiment, light source 47 comprises a solid-state visible laser diode (VLD) which is driven by a conventional driver circuit 48. In the illustrative embodiment, the wavelength of laser light produced from laser diode 47 is about 670 nanometers. In order to scan the laser beam output from laser diode 47 over a scan field having a predetermined spatial extent in front of the head portion of the housing, a planar scanning mirror 49 can be oscillated back and forth by a stepper motor 50 driven by a conventional driver circuit 51, as shown. However, it is understood that other conventional laser scanning mechanisms may be used to practice the present invention.

To selectively activate laser light source 47 and scanning motor 50, the system controller provides laser diode enable signal EL and scanning motor enable signal $E_M$ as input to driver circuits 48 and 51, respectively. When enable signal $E_L$ is a logical "high" level (i.e., $E_L=1$), a laser beam is generated, and when $E_M$ is a logical high level the laser beam is scanned through the transmission aperture and across the scan field.

When an object such as product bearing a bar code symbol is presented within the scan field at the time of scanning, the laser beam incident thereon will be reflected. This will produce a laser light return signal of variable intensity which represents a spatial variation of light reflectivity characteristic of the spaced apart pattern of bars comprising the bar code symbol. Photoreceiving circuit 12 is provided for the purpose of detecting at least a portion of laser light of variable intensity, which is reflected off the object and bar code symbol within the scan field, and subsequently focused along a focused laser light return path within the housing, onto the photosensor of photo-receiving circuit 12. Upon detection of this scan data signal, photo-receiving circuit 12 produces an analog scan data signal $D_1$ indicative of the detected light intensity.

Figure 3:
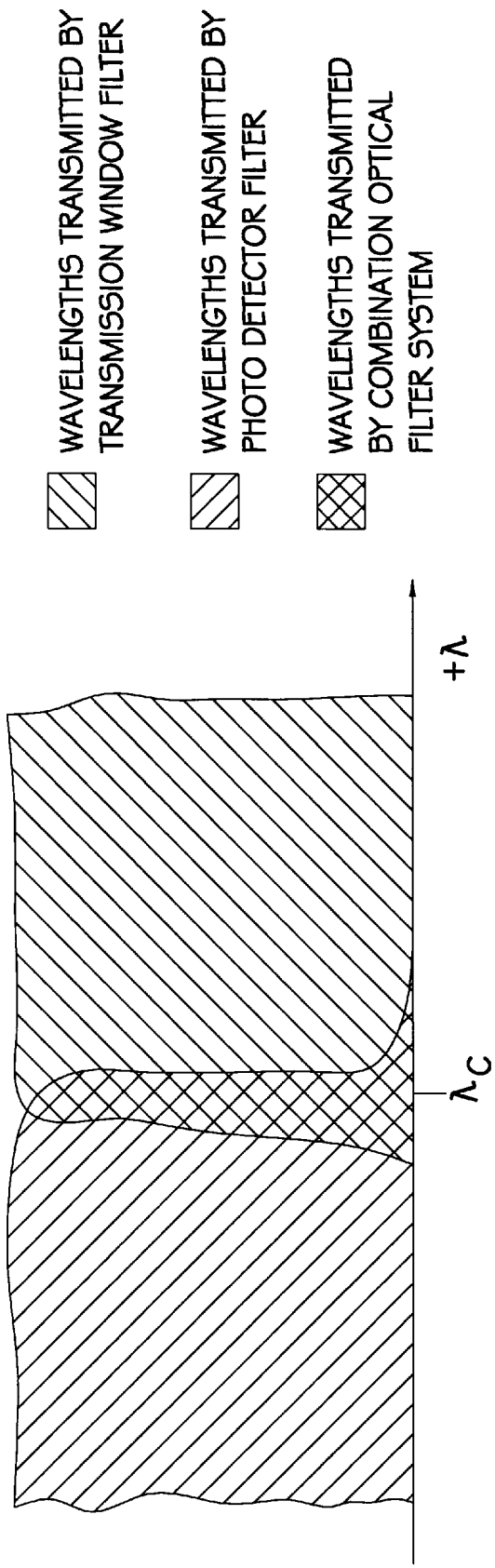
FIG. 3 is a schematic representation of the spectraltransmission characteristics of the first and second optical filter elements employed in the laser bar code symbol reading device of the present invention, graphically illustrating how the spectral transmission characteristics of these spatially-separated optical filter elements cooperate to produce a narrow-band optical filter system centered about the characteristic wavelength of the visible laser scanning beam.

In the illustrative embodiment, photoreceiving circuit 12 generally comprises scan data collection optics 53, which focus optical scan data signals for subsequent detection by a photoreceiver 54 having, mounted in front of its sensor, a wavelength-selective filter 150 which only transmits optical radiation of wavelengths up to a small band above 670 nanometers, as illustrated in FIG. 3. Photoreceiver 54, in turn, produces an analog signal which is subsequently amplified by preamplifier 55 to produce analog scan data signal $D_1$. In combination, scanning means 11 and photoreceiving circuit 12 cooperate to generate scan data signals from the scan field, over time intervals specified by the system controller. As illustrated hereinafter, these scan data signals are used by bar code presence detection module 14, bar code scan range detection module 15 and symbol decoding module 16.

As illustrated in FIG. 4, analog scan data signal $D_1$ is provided as input to A/D conversion circuit 13. As is well known in the art, A/D conversion circuit 13 processes analog scan data signal $D_1$ to provide a digital scan data signal $D_2$ which resembles, in form, a pulse width modulated signal, where logical "1" signal levels represent spaces of the scanned bar code and logical "0" signal levels represent bars of the scanned bar code. A/D conversion circuit 13 can be realized by any conventional A/D chip. Digitized scan data signal $D_2$ is provided as input to bar code presence detection module 14, bar code scan range detection module 15 and symbol decoding module 16.

The purpose and function of bar code presence detection module 14 is to determine whether a bar code is present in or absent from the scan field over time intervals specified by the system controller. When a bar code symbol is detected in the scan field, the bar code presence detection module 14 automatically generates second control activation signal $A_2$ (i.e., $A_2=1$) which is provided as input to the system controller, as shown in FIG. 4. Preferably, bar code presence detection module 14 is realized as a mircrocode program carried out by the microprocessor and associated program and buffer memory, described hereinbefore. The function of the bar code presence detection module is not to carry out a decoding process but rather to simply and rapidly determine whether the received scan data signals produced during bar code presence detection, represent a bar code symbol residing within the scan field. There are many ways in which to realize this function through a programming implementation.

When a bar code symbol envelope is detected, the bar code symbol presence detection module provides second control activation signal $A_2=1$ to the system controller. As will be described in greater detail hereinafter, second control activation signal $A_2=1$ causes the device to undergo a transition from the bar code presence detection state to bar code symbol reading state.

The function of symbol decoding module 16 is to process, scan line by scan line, the stream of digitized scan data $D_2$, in an attempt to decode a valid bar code symbol within a predetermined time period allowed by the system controller. When the symbol decoding module successfully decodes a bar code symbol within the predetermined time period, symbol character data $D_3$ (typically in ASCII code format) is produced corresponding to the decoded bar code symbol. Thereupon a third control activation signal $A_3$ is automatically produced by the symbol decoding module and is provided to the system controller in order to perform its system control function.

As shown in FIG. 4, system controller 22 generates and provides enable signals $E_{FC}$, $E_{DS}$, $E_{DT}$, to data format conversion module 17, data storage unit 18 and data transmission circuit 19, respectively, at particular stages of its control program. As illustrated, symbol decoding module 16 provides symbol character data $D_3$ to data format module 17 to convert data $D_3$ into two differently formatted types of symbol character data, namely $D_4$ and $D_5$. Format-converted symbol character data $D_4$ is of the "packed data" format, particularly adapted for efficient storage in data storage unit 18. Format-converted symbol character data $D_5$ is particularly adapted from data transmission to data collection and storage device 3, or a host device such as, a computer or electronic cash register. When symbol character data $D_4$ is to be converted into the format of the user's choice (based on a selected option mode), the system controller will generate and provide enable signal $E_{DS}$ to data storage unit 18, as shown in FIG. 4. Similarly, when format converted data $D_5$ is to be transmitted to a host device, the system controller will generate and provide enable signal $E_{DT}$ to data transmission circuit 19. Thereupon, data transmission circuit 19 transmits format-converted symbol character data $D_5$ to data collection device 3, via the data transmission lines of flexible connector cable 4.

It is understood that there are a variety of ways in which to configure the above-described system components within the housing of bar code symbol reading device 2, while successfully carrying out the functions of the present invention. In FIGS. 2 and 2A, one preferred arrangement is illustrated.

In FIG. 2A, the optical arrangement of the system components is shown. Specifically, visible laser diode 47 is mounted in the rear corner of circuit board 64 installed within the head portion of the housing. A stationary concave mirror 53 is mounted centrally at the front end of circuit board 63, primarily for collecting laser light. Notably, the height of concave mirror 53 is such that it does not block light transmission aperture 6. Mounted off center onto the surface of concave mirror 53, is very small second mirror 64 for directing the laser beam to planar mirror 49 which is connected to the motor shaft of a scanning motor 50, for joint oscillatory movement therewith. As shown, scanning motor 50 is mounted centrally at the rear end of circuit board 63. In the opposite rear corner of circuit board 63, photodetector 54 is mounted.

In operation, laser diode 47 adjacent the rear of the head portion, produces and directs a laser beam in a forward direction to the small stationary mirror 64 and is reflected back to oscillating mirror 49. Oscillating mirror 49 scans the laser beam over the scan field. The returning laser light, reflected from the bar code, is directed back to oscillating mirror 49, which also acts as a collecting mirror. This oscillating mirror then directs the beam to stationary concave mirror 53 at the forward end of the housing head portion. The beam reflected from the concave mirror 53 is directed to photodetector 54 to produce an electrical signal representative of the intensity of the reflected light.

In front of stationary concave mirror 53, IR LED 28 and photodiode 31 are mounted to circuit board 63 in a slightly offset manner from longitudinal axis 9 of the head portion of the housing. Apertures 65 and 66 are formed in opaque portion 7B of the housing below the transmission aperture, to permit transmission and reception of IR type object sensing energy, as hereinbefore described. In order to shield IR radiation from impinging on photodiode 31 via the housing, a metallic optical tube 67 having an aperture 68 encases photodiode 31. By selecting the size of aperture, the placement of photodiode 31 within optical tube 67 and/or the radiation response characteristics of the photodiode, desire geometric characteristics for the object detection field can be achieved, as described hereinbefore.

To prevent optical radiation slightly below 670 nanometers from entering the transmission aperture 6, and transmitting therethrough only optical radiation from slightly below 670 nanometers, a plastic filter lens 69 is installed over the transmission aperture 6, as shown in FIG. 1. In this way the combination of plastic filter lens 69 installed at the transmission aperture and the wavelength selective filter 150 mounted before photoreceiver 54, as shown in FIG. 2A, cooperate with each other in terms of wavelength selection characteristics, to form a narrow band-pass optical filter system having a center wavelength $\lambda_c=670$ nanometers, as shown in FIG. 3.

In the illustrative embodiment, plastic window filter lens 69 is made from acrylic-type plastic material (e.g., DuPont RD 2177) which can be purchased in 4'×8' sheets. These acrylic sheets are cut to size so as to fit over the light transmission aperture 6. The resulting plastic filter lens 69 is then installed into the light transmission aperture in a manner well known in the art.

Wavelength-selective filter 150 is preferably made by coating (i.e., depositing) a multi-layer dielectric film onto a glass substrate. In a vacuum environment (i.e., chamber), the dielectric film is preferably deposited onto the glass substrate by evaporating a dielectric material with an electric beam, in a manner well known in the art. Thereafter, the resulting substrate with the dielectric film deposited thereon is cut into small pieces having physical dimensions approximately the size of the photosensor in photoreceiver 2, as shown in FIGS. 2 and 2A, thereby providing wavelength-selective filter 150. The wavelength-selective filter 150 is then mounted immediately in front of the photosensor, as shown in FIGS. 2 and 2A.

The novel optical filter arrangement described above provides a number of important advantages to the laser scanner in which it is embodied.

Firstly, the narrow-band optical filter system of the present invention rejects wavelengths outside the narrow-band of spectral components comprising the laser scanning beam (i.e. associated with ambient light noise), and this improves the signal-to-noise ratio for detected scan data signals $D_1$.

Secondly, the spectral filtering characteristics of plastic filter lens 69 inherently appears reddish to the human vision system by virtue of the fact that lens 69 only permits transmission of optical radiation from slightly below 670 nanometers. Thus, the semi-transparent nature of filter lens 69 naturally hides from plain view, the laser, the mirror, the scanning motor, and other electro-optical components within the housing that otherwise might present source of fear in customers at a POS station, and/or detract from the aesthetic appearance of the scanning system installed at POS station.

Thirdly, the plastic filter lens 69 with its specified optical properties is easy and inexpensive to manufacture using injection molding techniques well known in the art. Thus, it may be made as large as desired or formed (i.e., shaped) to embody beam-shaping or beam-directing characteristics, without substantially increasing the cost of manufacture of this optical filter element.

Wavelength-selective filter element 150, on the other hand, is very expensive and difficult to manufacture, by virtue of its specified optical properties. However, as this optical filter element 150 is installed along the focused laser light return path, in front of photoreceiving sensor 54 as shown in FIG. 2A, its size can be maintained extremely small, independent of the surface area of the light transmission aperture, and thus the plastic filter lens 69. Consequently, conventional techniques can be used to manufacture this small-sized optical filter element, and thus the cost of manufacture of this optical element can be minimized.

Fourthly, by using spatially-separated optical filter elements (i.e., plastic filter lens 69 and filter element 150), the use of special optical cements and bonding techniques otherwise required to physically bound such elements together in an integral filter structure, are avoided altogether. This fact simplifies significantly the manufacturability of the laser scanner of the present invention.

The optical filter system described above may be embodied in any type of laser bar code symbol scanner. An example of such an alternative laser scanner design is shown in FIGS. 5 and 5A.

Figure 5:
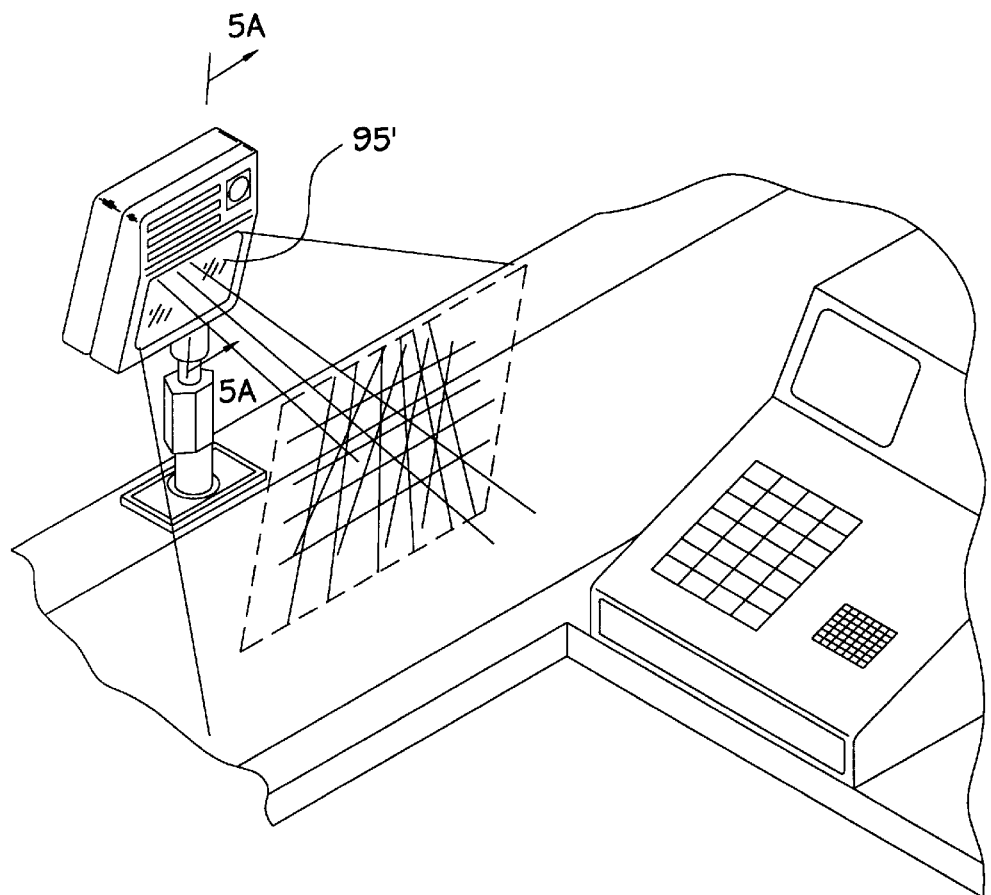
FIG. 5 is a perspective view of alternative embodiment of the laser bar code symbol reading device of the present invention.
Figure 5A:
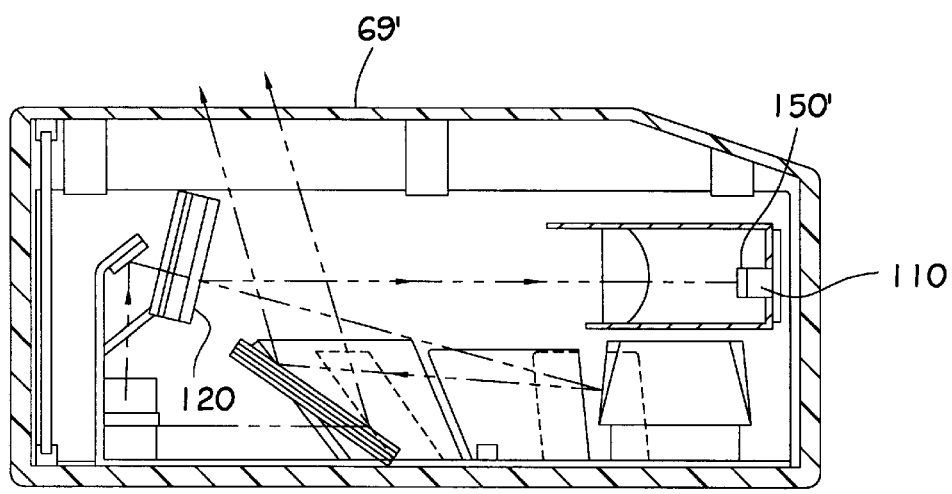
FIG. 5A is a cross-sectional view of the laser bar code symbol reading device of FIG. 5, taken along line 5A—5A thereof.

In FIGS. 5 and 5A, the optical filter system of the present invention is shown embodied in the laser projection scanner disclosed in U.S. Pat. No. 5,216,232. As disclosed in FIGS. 5 and 5A, plastic filter element 69' is functionally similar to optical filter element 69 and covers the light transmission aperture of the compact housing of the laser projection scanner, while wavelength selective filter 150' is disposed in front of its photodector 110 along the focused laser light return path defined between light focusing mirror 120 and photodector 110, as shown in FIG. 5A. By virtue of the principles of the present invention, plastic filter element 69' over light transmission aperture 6' can be made substantially larger than wavelength selective filter 150', as required in practical scanner designs, yet it provides all of the advantages described above.

In alternative laser scanner designs the alternate optical filter system disclosed herein may be embodied within laser holographic scanners used to read code symbols in various applications.

While the particular illustrative embodiments shown and described above will be useful in many applications in code symbol reading, further modifications to the present invention herein disclosed will occur to persons skilled in the art. All such modifications are deemed to be within the scope and spirit of the present invention defined by the amended claims.

What is claimed is:

1. A laser symbol scanning system, comprising:
    a housing having a light transmission aperture through which light can enter and exit said housing;
    laser beam source in said housing for producing a laser beam characterized by a predetermined wavelength;
    laser beam scanning element in said housing for projecting said laser beam through said aperture and scanning said laser beam across a code symbol on an object located within at least a portion of a scan field defined external to said housing;
    light collection element for collecting laser light reflected off said code symbol and pas sing through said aperture;
    laser light detection element in said housing disposed in said laser light path, for detecting the intensity of laser light reflected off said code symbol and collected by said light collection element;
    a laser beam directing element mounted to the surface of said light collection element for directing the laser beam produced by said laser beam production element to said laser beam scanning mechanism; and
    a pair of optical filter elements in said housing, spatially separated from each other, each optical filter element having wavelength-selective filtering characteristics, said pair of optical filter elements cooperating so as to form a band-pass optical filtering system having a narrow wavelength bandwidth positioned about said predetermined wavelength such light reflected off said code symbol having wavelengths only within said narrow wavelength bandwidth reach said laser light detection element and wherein one of said pair of optical filtering elements is disposed in said light transmission aperture and functions as a scanning window in said housing.

2. The laser code symbol scanning system of claim 1, wherein said predetermined wavelength is about 670 nanometers.

3. The laser code symbol scanning system of claim 1 wherein one of said pair of optical filtering elements is disposed adjacent said light detecting means.

4. The laser code symbol scanning system of claim 1 wherein said wavelength filtering characteristics of said scanning window obscures each of said elements positioned in said housing from plain view.

5. The laser code symbol scanning system of claim 1 wherein said wavelength filtering characteristics of said scanning window appear reddish in color.

6. The laser code symbol scanning system of claim 1 wherein in said housing is a compact hand-supportable housing.

7. The laser code symbol scanning system of claim 1 wherein said laser light collection element is concave mirror.

8. The laser code symbol scanning system of claim 1 wherein said laser light directing element is a plane mirror.

9. The laser code symbol scanning system of claim 1 wherein said laser light directing element is mounted off center of the laser light collection element.

10. The laser bar code symbol scanning system of claim 1 wherein said housing a compact fixed-mounted housing.

11. A method for scanning a bar code on an object, comprising the steps of:

positioning a bar code scanning field of a bar code reader over a bar code on an object to be scanned;

producing a laser beam having a predetermined wavelength from a laser source;

directing said laser beam from said laser source to a scanning element;

scanning said produced laser beam across said bar code scanning field and said barcode;

reflecting light including said laser beam from said bar code to said bar code reader; and preventing certain wavelengths of light reflected from said bar code from passing through a scanning window having wavelength-selective filtering characteristics and into said bar code reader.

12. The method for scanning a bar code of claim 11, further comprising the steps of:

collecting said reflected light from said bar code and passed through said scanning window;

focussing said collected light onto a light detection element in said bar code reader; and preventing wavelengths of light, other than said predetermined wavelength which are reflected from said bar code and passed through said scanning window, from passing into said light detection element.

13. A method for scanning a bar code on an object, comprising the steps of:

positioning a bar code scanning field of a bar code reader over a bar code on an object to be scanned;

producing a laser beam having a predetermined wavelength from a laser source;

scanning said produced laser beam across said bar code scanning field and said bar code;

reflecting light including said laser beam from said bar code to said bar code reader;

preventing certain wavelengths of light reflected from said bar code from passing through a scanning window having wavelength-selective filtering characteristics and into said bar code reader;

collecting said reflected light from said bar code and passed through said scanning window;

focussing said collected light onto a light detection element in said bar code reader; and preventing wavelengths of light, other than said predetermined wavelength which are reflected from said bar code and passed through said scanning window, from passing into said light detection element.

\* \* \* \* \*